(12) United States Patent  
Shiokawa et al.

(10) Patent No.: US 9,713,899 B2
(45) Date of Patent: Jul. 25, 2017

(54) BLOW MOLDING DEVICE

(71) Applicants: Mitsuru Shiokawa, Tokyo (JP); Shinichi Tabata, Tokyo (JP); Nobuyuki Tamura, Tokyo (JP)

(72) Inventors: Mitsuru Shiokawa, Tokyo (JP); Shinichi Tabata, Tokyo (JP); Nobuyuki Tamura, Tokyo (JP)

(73) Assignee: DISCMA AG, Hünenberg (CH)

( * ) Notice: Subject to any disclaimer, the term of this patent is extended or adjusted under 35 U.S.C. 154(b) by 0 days.

(21) Appl. No.: 14/912,218

(22) PCT Filed: Aug. 6, 2014

(86) PCT No.: PCT/JP2014/004112
§ 371 (c)(1),
(2) Date: Feb. 16, 2016

(87) PCT Pub. No.: WO2015/045253
PCT Pub. Date: Apr. 2, 2015

(65) Prior Publication Data
US 2016/0200029 A1    Jul. 14, 2016

(30) Foreign Application Priority Data

Sep. 30, 2013  (JP) .................................. 2013-205895

(51) Int. Cl.
*B29C 49/46* (2006.01)
*B29C 49/42* (2006.01)
(Continued)

(52) U.S. Cl.
CPC .......... *B29C 49/4268* (2013.01); *B29C 49/46* (2013.01); *B29C 49/60* (2013.01);
(Continued)

(58) Field of Classification Search
CPC ................ B29C 49/4268; B29C 49/46; B29C 2049/4664; B29C 2049/4665; B29C 2049/465
See application file for complete search history.

(56) References Cited

U.S. PATENT DOCUMENTS

2008/0029928 A1    2/2008  Andison et al.
2011/0268855 A1*  11/2011  Chauvin ................. B29C 49/46
                                                       426/407
(Continued)

FOREIGN PATENT DOCUMENTS

JP    2000-043129 A    2/2000
JP    2000-167915 A    6/2000
(Continued)

OTHER PUBLICATIONS

Nov. 4, 2014 International Search Report issued in International Patent Application No. PCT/JP2014/004112.
Sep. 5, 2016 Office Action issued in Chinese Patent Application No. 2014800457797.
Nov. 8, 2016 Office Action issued in Japanese Patent Application No. 2013-205895.

*Primary Examiner* — Robert B Davis
(74) *Attorney, Agent, or Firm* — Oliff PLC

(57) ABSTRACT

A blow molding device includes a blow molding mold to which a bottomed tubular preform is fitted, a blow nozzle that is fitted to a mouth tubular portion of the preform fitted to the mold, and a pressurized liquid supply unit configured to supply a pressurized liquid to the blow nozzle. The preform is to be molded into a shape conforming to a cavity of the mold by filling the liquid into the preform through the blow nozzle. The blow molding device further includes: a deaeration mechanism that is connected to the blow nozzle. The liquid is filled into the preform through the blow nozzle after air that is present within the preform fitted to the mold is sucked out by the deaeration mechanism.

2 Claims, 3 Drawing Sheets

(51) Int. Cl.
 *B29C 49/60* (2006.01)
 *B29K 67/00* (2006.01)
 *B29K 105/00* (2006.01)
 *B29L 31/00* (2006.01)
 *B29C 49/06* (2006.01)
 *B29C 49/12* (2006.01)

(52) U.S. Cl.
 CPC .............. *B29C 49/06* (2013.01); *B29C 49/12* (2013.01); *B29C 2049/465* (2013.01); *B29C 2049/4664* (2013.01); *B29C 2049/6009* (2013.01); *B29K 2067/003* (2013.01); *B29K 2105/258* (2013.01); *B29L 2031/7158* (2013.01)

(56) References Cited

U.S. PATENT DOCUMENTS

2013/0164404 A1  6/2013  Maki et al.
2013/0180219 A1* 7/2013  Chauvin ................ B65B 3/022
                                             53/559

FOREIGN PATENT DOCUMENTS

JP   2007-261651 A   10/2007
JP   2009-533290 A   9/2009
WO   2013/114796 A1  8/2013

* cited by examiner

US 9,713,899 B2

BLOW MOLDING DEVICE

TECHNICAL FIELD

The present disclosure relates to a blow molding device that blow molds a bottomed tubular preform, in particular such a blow molding device that uses a liquid as a pressurized fluid.

BACKGROUND

Resin bottles, representatives of which are Oriented Poly-Polypropylene (OPP) bottles and Poly-Ethylene Terephthalate (PET) bottles, are used in various fields, such as beverages, foods, cosmetics, and so forth. Such a bottle is generally formed in a predetermined shape by biaxially stretch blow molding a resin preform by using a blow molding device. The resin preform has been formed in a bottomed tubular shape by, for example, injection molding.

The blow molding device includes: a blow molding mold to which a preform, after heated to a temperature at which the preform is stretchable, is fitted; a blow nozzle that is fitted to a mouth tubular portion of the preform fitted to the mold; and a pressurized liquid supply unit configured to supply a pressurized liquid to the blow nozzle. By filling the pressurized liquid into the preform through the blow nozzle, the preform is stretched axially and radially into a shape conforming to a cavity of the mold.

One example of such a blow molding device is the one, as described in Patent Literature 1, that uses a pressurized liquid, instead of pressurized air, as the fluid that is filled into the preform. In this case, by using a content liquid, such as a beverage, a cosmetic product, a pharmaceutical product, or the like, that is to be filled in a final product as the liquid, the step of filling the content medium to the bottle may be omitted, and the production process and the configuration of the blow molding device may be simplified.

CITATION LIST

Patent Literature

PTL 1: JP2000043129A

SUMMARY

Technical Problem

However, in a conventional blow molding device that performs blow molding by filling a pressurized liquid into a preform, the filling of the liquid during blow molding involves entrainment of air present within the preform into the liquid. This poses the problem that the volume of the liquid filled in the molded bottle is unstable. Another problem is that the entrained air is dissolved in the liquid due to pressure applied during the filling of the liquid, and the dissolved air appears as bubbles within the bottle after completion of the filling.

The present disclosure has been conceived in view of the above problems, and the present disclosure is to provide a blow molding device that prevents entrainment of air into the liquid during blow molding using the pressurized liquid.

Solution to Problems

One of aspects of the present disclosure resides in a blow molding device including a blow molding mold to which a bottomed tubular preform is fitted, a blow nozzle that is fitted to a mouth tubular portion of the preform fitted to the mold, and a pressurized liquid supply unit configured to supply a pressurized liquid to the blow nozzle, the preform being to be molded into a shape conforming to a cavity of the mold by filling the liquid into the preform through the blow nozzle, the blow molding device including: a deaeration mechanism that is connected to the blow nozzle, wherein the liquid is filled into the preform through the blow nozzle after air that is present within the preform fitted to the mold is sucked out by the deaeration mechanism.

In a preferred embodiment of the blow molding device, the deaeration mechanism has a function of supplying flush air into a flow path connecting the deaeration mechanism and the blow nozzle to return the liquid within the flow path to the blow nozzle.

In another preferred embodiment of the blow molding device, the blow molding device further includes: a stretching rod that is arranged coaxially with the blow nozzle and that is displaceable into the cavity of the mold to stretch the preform axially.

Advantageous Effect

According to the blow molding device of the present disclosure, since the liquid is filled into the preform through the blow nozzle after the air that is present within the preform is sucked out by the deaeration mechanism, entrainment of air into the liquid to be filled into the preform is prevented. Accordingly, the volume of the liquid filled in the molded bottle is maintained stable, and occurrence of the bubbles from the filled liquid is prevented. Thus, the quality of the product manufactured by the blow molding device is improved.

DETAILED DESCRIPTION

The following describes one of embodiments of the present disclosure in detail with reference to the drawings.

Figure 1:
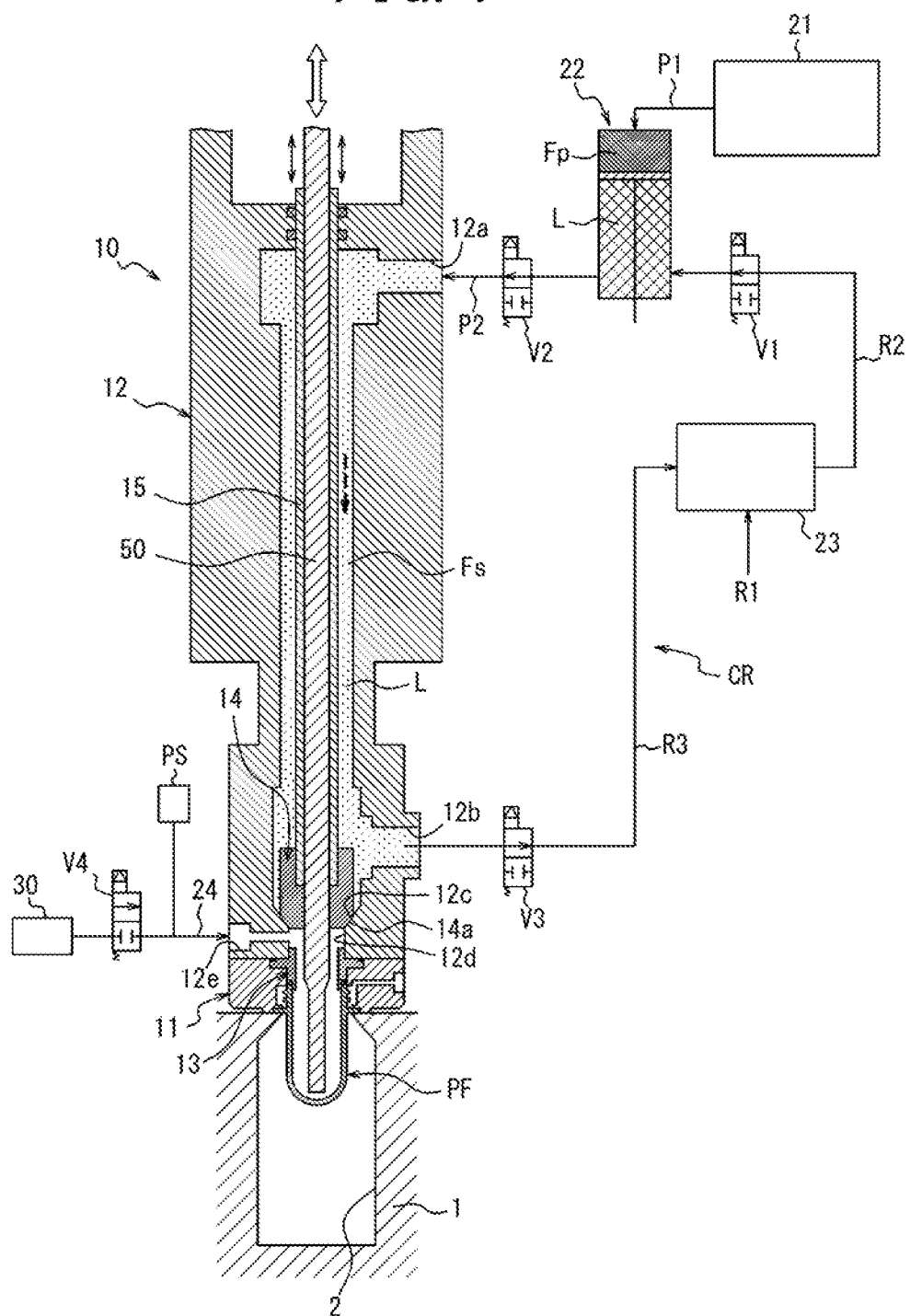
FIG. 1 schematically illustrates a blow molding device according to one of embodiments of the present disclosure.

A blow molding device according to the embodiment of the present disclosure illustrated in FIG. 1 includes a blow molding mold 1. The mold 1 has a bottle-shaped cavity 2, and the mold 1 is open upward on an upper surface thereof. Although not illustrated in detail, the mold 1 is openable into right and left mold halves, and a molded product may be removed from the mold 1 by opening the mold 1.

Figure 2:
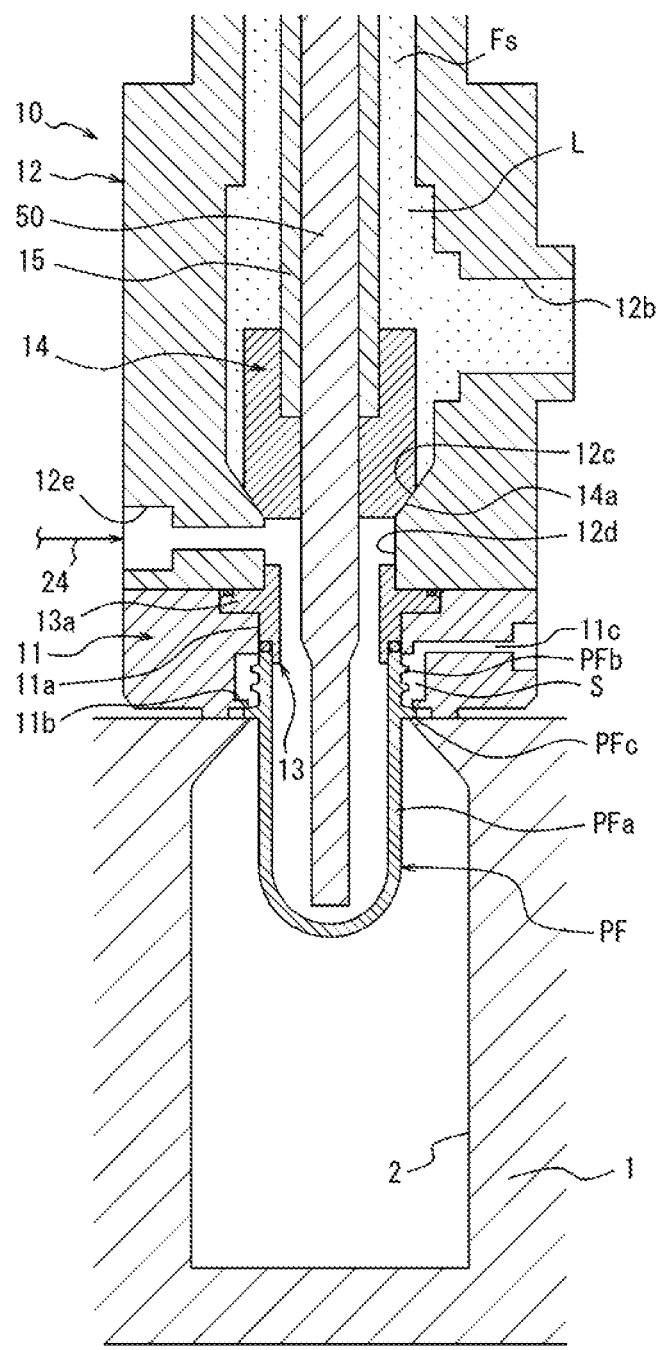
FIG. 2 is an enlarged sectional view illustrating a part of the blow molding device of FIG. 1.

To the mold 1, a preform PF is fitted. The preform PF has been blow molded by the blow molding device into a bottle. As illustrated in FIG. 2, examples of the preform PF include the one which is generally formed in a bottomed cylindrical shape by using a resin material, such as PolyPropylene (PP), which includes a cylindrical mouth tubular portion PFb in an upper end of a main body PFa having a test tube shape, and which includes a neck ring PFc in a lower end portion of the mouth tubular portion PFb. The preform PF is fitted to the mold 1, with the main body PFa being disposed within the cavity 2 of the mold 1, with the neck ring PFc abutting against the upper surface of the mold 1, and with the mouth tubular portion PFb projecting to the outside (upward in FIGS. 1 and 2) of the mold 1.

Above the mold 1, there is disposed a nozzle unit 10 that is relatively displaceable upward and downward with respect to the mold 1. The nozzle unit 10 includes a holding member 11, a supply tubular portion 12, and a blow nozzle 13.

As illustrated in FIG. 2, the holding member 11 is formed in a block shape provided in the middle thereof with a through hole 11a extending vertically, and the holding member 11 is configured to abut against the upper surface of the mold 1 when the nozzle unit 10 is displaced downward to the lower end. When the holding member 11 abuts against the upper surface of the mold 1, an upper end of the mouth tubular portion PFb of the preform PF fitted to the mold 1 is fitted inside the through hole 11a of the holding member 11, and the neck ring PFc is sandwiched between a supporting flange piece 11b provided in the holding member 11 and the upper surface of the mold 1, and thus, the preform PF is held in a fitted position that is perpendicular to the mold 1.

Between an outer circumferential surface of the mouth tubular portion PFb of the preform PF fitted to the mold 1 and an inner circumferential surface of the holding member 11, space S surrounding these members is defined and formed. A vent hole 11c communicating with the space S is also provided in the holding member 11.

The supply tubular portion 12 is formed as a cylindrical member provided inside thereof with a supply path Fs extending vertically. The supply tubular portion 12 is fixed to an upper end of the holding member 11, and the supply tubular portion 12, together with the holding member 11, is relatively displaceable upward and downward with respect to the mold 1. As illustrated in FIG. 1, the supply tubular portion 12 is provided on an upper end side thereof with an introduction port 12a communicating with the supply path Fs and is also provided on a lower end side thereof with a discharge port 12b communicating with the supply path Fs. Furthermore, the supply tubular portion 12 is provided, in a lower end of an inner surface thereof that forms the supply path Fs provided in the supply tubular portion 12, with a seal surface 12c having an inclined conical surface shape whose diameter is reduced downward. In an axis of the seal surface 12c, a supply hole 12d, through which the supply path Fs opens downward, is also provided.

The blow nozzle 13 is attached to the lower end of the supply tubular portion 12. The blow nozzle 13 is generally formed in a tubular shape. An upper end of the blow nozzle 13 is fitted inside the supply hole 12d and communicates with the supply hole 12d, and a flange portion 13a of the blow nozzle 13 is sandwiched between the holding member 11 and the supply tubular portion 12 and fixed to the lower end of the supply tubular portion 12. As illustrated in FIG. 2, when the nozzle unit 10 is displaced downward to the lower end position, the blow nozzle 13 is fitted inside the mouth tubular portion PFb of the preform PF fitted to the mold 1 in the lower end of the blow nozzle 13, thus communicating with an inside of the preform PF.

In the supply path Fs, an opening-closing body 14, configured to open and close the supply hole 12d, is disposed. The opening-closing body 14 is formed in a short cylindrical shape and provided, in an outer peripheral portion of a lower end surface thereof, with a tapered abutment surface 14a. The abutment surface 14a has the same inclination angle as that of the seal surface 12c, so that the abutment surface 14a may closely contact the seal surface 12c. The opening-closing body 14 is coaxially fixed to a lower end of a shaft body 15 with a long and narrow cylindrical rod shape arranged along the axis of the supply path Fs, and the opening-closing body 14, together with the shaft body 15, is displaceable upward and downward within the supply path Fs. As illustrated in FIGS. 1 and 2, by the abutment surface of the opening-closing body 14 abutting against the seal surface 12c provided in the lower end portion of the supply tubular portion 12, the supply hole 12d is closed by the opening-closing body 14, thereby closing the communication of the supply path Fs into the inside of the preform PF through the blow nozzle 13. On the other hand, when the opening-closing body 14, together with the shaft body 15, is displaced upward and when the abutment surface 14a of the opening-closing body 14 comes off the seal surface 12c provided in the supply tubular portion 12, the supply hole 12d is opened, thereby bringing the supply path Fs into communication with the inside of the preform PF through the blow nozzle 13.

As illustrated in FIG. 1, a pressurizing device 21, a pressurized liquid supply unit 22, and a liquid circulation unit 23 are connected to the nozzle unit 10.

The pressurizing device 21 is configured, for example, by a pressurizing pump, a compressor, and the like, and the pressurizing device 21 is connected to the pressurized liquid supply unit 22 through a pipe P1. The pressurized liquid supply unit 22 may be configured, for example, by a plunger pump, a piston-cylinder mechanism, or the like, and the pressurized liquid supply unit 22 is operated by a pressurized fluid Fp supplied from the pressurizing device 21 and configured to supply the pressurized liquid L into the supply path Fs from the introduction port 12a through a pipe P2.

The liquid circulation unit 23 has the functions of regulating the liquid L to a predetermined temperature and supplying the liquid L to the pressurized liquid supply unit 22 through a pipe R2 while requesting a replenishment of additional liquid L and of circulating the liquid L between the pressurized liquid supply unit 22 and the supply path Fs while regulating the liquid L to a predetermined temperature. That is to say, the liquid L may be circulated around a circulation path CR formed along the supply path Fs→discharge port 12b→pipe R3→liquid circulation unit 23→pipe R2→pressurized liquid supply unit 22→pipe P2→introduction port 12a→supply path Fs, as needed.

Three electromagnetic valves V1, V2, and V3 are disposed in the circulation path CR, and the predetermined flow paths are opened and closed by the corresponding valves V1, V2, and V3 in accordance with processes in blow molding.

The supply tubular portion 12 is provided with a connection port 12e communicating with the blow nozzle 13 through the supply hole 12d, and a deaeration mechanism 30 is connected to the connection port 12e through a flow path 24. The deaeration mechanism 30 may include a pump device, such as a suction pump and a vacuum pump, and the deaeration mechanism 30 may suck out air that is present within the preform PF fitted to the mold 1 through the blow nozzle 13 and remove the air from the preform PF. An electromagnetic valve V4 is disposed in the flow path 24, and the flow path 24 between the deaeration mechanism 30 and the connection port 12e may be opened and closed by the valve V4.

The deaeration mechanism 30 is preferably configured to suck out all the air that is present in the preform PF. However, the deaeration mechanism 30 may also be configured to suck out at least air that is present within the main body PFa of the preform PF. The deaeration mechanism 30 may also be configured to stabilize the volume of the liquid L filled in the molded bottle without the need for sucking out all the air that is present within the preform PF and to suck out only a part of the air within the preform PF to the extent where occurrence of bubbles from the filled liquid L is prevented.

The deaeration mechanism 30 has the function of supplying low-pressure flush air, i.e., supplying low-pressure air momentarily, into the flow path 24 through which the deaeration mechanism 30 is connected to the blow nozzle 13. By the deaeration mechanism 30 supplying low-pressure flush air into the flow path 24, the liquid remaining within the flow path 24 is dispelled by puff blow, i.e., momentary blow of flush air, to return to the blow nozzle 13 and then within the preform PF fitted to the mold 1.

Between the connection port 12e and the deaeration mechanism 30, there is disposed a pressure sensor PS. Based on the pressure in the flow path 24, that is to say, within the preform PF, that is detected by the pressure sensor PS, operations of the deaeration mechanism 30 and the valve V4 are controlled.

Through an axis of the shaft body 15, a stretching rod 50 having a long and narrow columnar shape is inserted in a manner such that the stretching rod 50 is slidable vertically with respect to the shaft body 15. The stretching rod 50 is disposed coaxially with the blow nozzle 13 and is displaceable axially into the cavity 2 from the position where a tip (a lower end) of the stretching rod 50 is located close to a bottom surface within the preform PF fitted to the mold 1 to the position where the tip is located close to a lower end of the cavity 2 of the mold 1.

Figure 3:
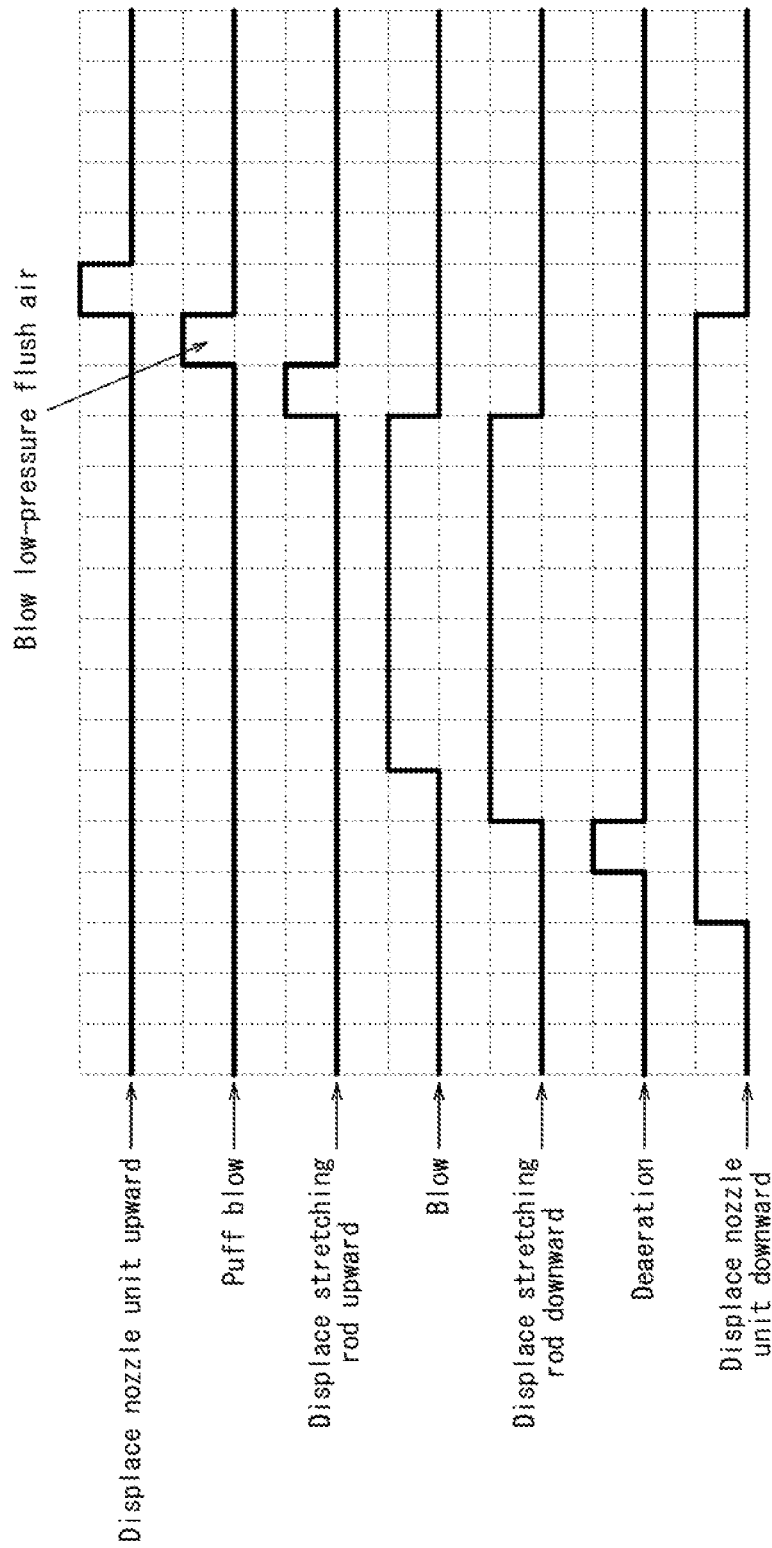
FIG. 3 is a timing chart diagram illustrating processes of blow molding by using the blow molding device of FIG. 1.

Subsequently, with reference to a timing chart diagram of FIG. 3, a description is given of a procedure for blow molding the preform PF into a bottle by using the blow molding device.

Firstly, the preform PF which, except for the mouth tubular portion PFb, is heated to a temperature suitable for blow molding is fitted to the blow molding mold 1, with the mouth tubular portion PFb being projected upward, and mold closing is performed.

Subsequently, the nozzle unit 10 is displaced downward to bring the holding member 11 into abutment against the upper surface of the mold 1. Thus, the state illustrated in FIG. 1 is achieved. At this time, the supply hole 12d is closed by the opening-closing body 14, and the tip of the stretching rod 50 is inserted into the preform PF. Furthermore, all the valves V1, V2, and V3 disposed in the circulation path CR are opened, and the liquid L is circulated around the circulation path CR while being regulated to a predetermined temperature by the liquid circulation unit 23.

Subsequently, the valve V4 is opened while the deaeration mechanism 30 is engaged in the sucking operation, so that the deaeration mechanism 30 communicates with the blow nozzle 13, that is to say, the inside of the preform PF. As a result, air that is present within the preform PF is sucked out by the deaeration mechanism 30, and the air is removed from the preform PF. Since the stretching rod 50 is disposed within the preform PF, even when the air within the preform PF is removed, the preform PF deforms in tight conformity to an outer circumferential surface of the stretching rod 50, thereby maintaining the bottomed cylindrical shape.

Once the pressure sensor PS detects that the air within the preform PF is fully removed, the stretching rod 50 is subsequently displaced downward to stretch the preform PF axially (longitudinally) by the stretching rod 50. At this time, the preform PF is preferably stretched until a lower end of the preform PF abuts against the lower end surface of the cavity 2 of the mold 1.

The stretch by the stretching rod 50 does not need to be performed after the air within the preform PF is removed by the deaeration mechanism 30 and may be performed while the air within the preform PF is being sucked out by the deaeration mechanism 30 or before the air within the preform PF is sucked out by the deaeration mechanism 30.

Subsequently, the opening-closing body 14, together with the shaft body 15, is displaced upward to open the supply hole 12d, and the valves V1, V2, and V3 are closed to stop the liquid L from circulating around the circulation path CR. Furthermore, blowing is performed by supplying the liquid L, pressurized by the pressurized liquid supply unit 22, into the preform PF from the supply hole 12d through the blow nozzle 13. This blowing process expands and stretches the preform PF by filling the liquid L thereto, and thus, a blow molded bottle having a shape conforming to the cavity 2 of the mold 1 is obtained.

At this time, since the air is removed from the inside of the preform PF by the deaeration mechanism 30 and entrainment of the air into the liquid L to be filled into the preform PF is prevented, the volume of the liquid L filled in preform PF is maintained stable, and occurrence of the bubbles from the liquid L is prevented. Thus, the quality of the product manufactured by the blow molding device is improved.

Additionally, in cases where the mouth tubular portion PFb undergoes diameter increase and deformation due to pressure of the liquid L, pressurized air may be introduced through the vent hole 11c provided in the holding member 11 to pressurize the space S surrounding the outer circumferential surface of the mouth tubular portion PFb. By doing so, the diameter increase and deformation are effectively prevented.

Subsequently, the opening-closing body 14, together with the shaft body 15, is displaced downward to close the supply hole 12d, and the valves V1, V2, and V3 are closed to let the liquid L circulate around the circulation path CR again. Furthermore, the stretching rod 50 is displaced upward, so that the stretching rod 50 is withdrawn from the preform PF after molding, that is to say, the bottle. At this time, due to the withdrawal of the stretching rod 50, all the liquid L remaining in the supply hole 12d flows into the bottle, and a liquid level in the bottle is also lowered. Accordingly, the liquid level of the liquid filled in the bottle may be regulated to create predetermined head space within the bottle. Additionally, as needed, the amount of the content medium M to be filled may be regulated more precisely by performing an additional step, such as a suck back step, after the stretching rod 50 is displaced upward.

Subsequently, puff blow is performed by supplying flush air from the deaeration mechanism 30 to the flow path 24 through which the deaeration mechanism 30 is connected to the blow nozzle 13, and the liquid L remaining in the flow path 24 is returned to the blow nozzle 13 and into the bottle. By thus supplying flush air from the deaeration mechanism 30 into the flow path 24 and returning the liquid L remaining within the flow path 24 to the blow nozzle 13, that is to say, to the bottle, differences in the amount of the liquid L filled are reduced, and contamination of the mold 1 due to liquid dripping from the blow nozzle 13 is prevented. Furthermore, the flush air supplied from the deaeration mechanism 30 alleviates pressure reduction within the bottle caused by the withdrawal of the stretching rod 50 and accordingly, prevents deformation of the bottle due to the pressure reduction. The amount of the flush air to be supplied from the deaeration mechanism 30 is preferably set so that the pressure within the bottle after the withdrawal of the stretching rod 50 equals atmospheric pressure.

Once the above processes are completed, the mouth tubular portion PFb of the bottle is removed from the blow nozzle 13, the mold 1 is opened, and the bottle filled with the liquid L is removed. Then, the mouth tubular portion PFb is sealed with a cap, and thus, the final product is achieved.

Needless to say, the present disclosure is not limited to the above embodiment, and various changes may be made without departing the gist of the present disclosure.

For example, although in the above embodiment the liquid L is circulated around the circulation path CR, the present disclosure is not limited to this embodiment, and the liquid L does not need to be circulated as long as the pressurized liquid L may be supplied from the pressurized liquid supply unit 22 into the preform PF through the blow nozzle 13.

Furthermore, although in the above embodiment the preform PF is stretched axially by using the stretching rod 50, the present disclosure is not limited to this embodiment, and the preform PF may be biaxially stretched by using only the pressure caused by the filling of the liquid L without using the stretching rod 50.

Moreover, an electromagnetic opening-closing valve may be disposed between the pressure sensor PS and the connection port 12e. In this case, the amount of the liquid L remaining in the flow path 24 may be reduced, and the liquid L may be returned to the blow nozzle 13 more easily.

Moreover, as the preform PF, the one with a shape including the main body PFa and the mouth tubular portion PFb and not including the neck ring PFc may also be used. Moreover, the material of the preform PF is not limited to polypropylene, and any other resin material, such as Poly-Ethylene Terephthalate (PET), may be used. The preform PF may also be a laminated structure in which a plurality of types of resin materials, including polypropylene or polyethylene terephthalate, is laminated.

REFERENCE SIGNS LIST

1 Mold
2 Cavity
10 Nozzle unit
11 Holding member
11a Through hole
11b Supporting flange piece
11c Vent hole
12 Supply tubular portion
12a Introduction port
12b Discharge port
12c Seal surface
12d Supply hole
12e Connection port
13 Blow nozzle
13a Flange portion
14 Opening-closing body
14a Abutment surface
15 Shaft body
21 Pressurizing device
22 Pressurized liquid supply unit
23 Liquid circulation unit
24 Flow path
30 Deaeration mechanism
50 Stretching rod
PF Preform
PFa Main body
PFb Mouth tubular portion
PFc Neck ring
S Space
Fs Supply path
P1, P2 Pipe
Fp Pressurized fluid
L Liquid
R1 to R3 Pipe
CR Circulation path
V1 to V4 Valve
PS Pressure sensor

The invention claimed is:

1. A blow molding device including a blow molding mold to which a bottomed tubular preform is fitted, a blow nozzle that is fitted to a mouth tubular portion of the preform fitted to the mold, and a pressurized liquid supply unit configured to supply a pressurized liquid to the blow nozzle, the preform being to be molded into a shape conforming to a cavity of the mold by filling the liquid into the preform through the blow nozzle, the blow molding device comprising:

a deaeration mechanism that is connected to the blow nozzle, wherein the liquid is filled into the preform through the blow nozzle after air that is present within the preform fitted to the mold is sucked out by the deaeration mechanism, and the deaeration mechanism has a function of supplying flush air into a flow path connecting the deaeration mechanism and the blow nozzle to return the liquid within the flow path to the blow nozzle after filling the liquid into the preform.

2. The blow molding device of claim 1, further comprising: a stretching rod that is arranged coaxially with the blow nozzle and that is displaceable into the cavity of the mold to stretch the preform axially.

* * * * *